(12) United States Patent
Gerhardt et al.

(10) Patent No.: US 7,047,948 B2
(45) Date of Patent: May 23, 2006

(54) FUEL TANK

(75) Inventors: Marc Gerhardt, Dortmund (DE); Thomas Zapp, Dortmund (DE)

(73) Assignee: Siemens Aktiengesellschaft, Munich (DE)

( * ) Notice: Subject to any disclaimer, the term of this patent is extended or adjusted under 35 U.S.C. 154(b) by 12 days.

(21) Appl. No.: 10/481,213

(22) PCT Filed: Jun. 21, 2002

(86) PCT No.: PCT/DE02/02286

§ 371 (c)(1),
(2), (4) Date: Dec. 17, 2003

(87) PCT Pub. No.: WO03/006273

PCT Pub. Date: Jan. 23, 2003

(65) Prior Publication Data

US 2004/0154670 A1 Aug. 12, 2004

(30) Foreign Application Priority Data

Jul. 13, 2001 (DE) ................ 101 33 400

(51) Int. Cl.
*F02M 37/04* (2006.01)
(52) U.S. Cl. ...................... 123/516; 123/519
(58) Field of Classification Search ................ 123/516, 123/518, 519, 520, 198 D, 521, 514
See application file for complete search history.

(56) References Cited

U.S. PATENT DOCUMENTS 3,917,109 A * 11/1975 MacDonald ................ 220/746
4,852,761 A    8/1989 Turner
4,919,103 A    4/1990 Ishiguro
5,408,977 A    4/1995 Cotton
5,704,337 A *  1/1998 Stratz et al. ................ 123/519
5,901,689 A    5/1999 Kimura
6,182,693 B1   2/2001 Stack
6,250,081 B1   6/2001 Dimitrievski
6,269,802 B1 * 8/2001 Denis et al. ................ 123/519
6,273,070 B1 * 8/2001 Arnal et al. ................ 123/519
6,354,280 B1 * 3/2002 Itakura et al. .............. 123/519
6,395,072 B1 * 5/2002 Miura et al. .................. 96/133
6,491,030 B1 * 12/2002 Zapp .......................... 123/516
6,591,866 B1 * 7/2003 Distelhoff et al. ..... 137/565.22

FOREIGN PATENT DOCUMENTS

| DE | 195 24 254 C1 | 1/1997 |
| DE | 198 53 097 A1 | 11/1998 |
| DE | 199 32 713 A1 | 7/1999 |
| DE | 199 57 769 A1 | 12/1999 |
| FR | 98 02019 | 2/1998 |
| FR | EP 0 921 025 A1 | 11/1998 |
| JP | 08347333 | 12/1996 |
| JP | 11153755 | 6/1999 |
| JP | 2000047317 | 2/2000 |
| JP | 20000164404 | 6/2000 |
| WO | WO 00/73644 A1 | 5/2000 |
| WO | WO 01/42642 A1 | 12/2000 |

* cited by examiner

*Primary Examiner*—Carl S. Miller
(74) *Attorney, Agent, or Firm*—Richard A. Speer; Mayer, Brown, Rowe & Maw LLP

(57) ABSTRACT

A fuel tank for a motor vehicle having a chamber delimited by a wall and having an activated carbon filter located to ventilate the volume of the fuel chamber located above the level of fuel in the tank.

4 Claims, 1 Drawing Sheet

FUEL TANK

BACKGROUND OF THE INVENTION

The invention relates to a fuel tank for a motor vehicle, having a chamber which is delimited by a wall and is used to hold fuel and having an activated carbon filter which is provided for the purpose of ventilating the area of the chamber located above the fuel during refueling and/or during operation.

Fuel tanks of this type are in widespread use in modern motor vehicles and are known in practice. The activated carbon filter has a housing which is made from the plastics polyamide or polypropylene and is partly reinforced with glass fibers and is connected to the chamber via a line which leads through the wall of the fuel tank.

A drawback of the known fuel tank is that fuel vapors can escape into the environment through the connections of the fuel tank and the activated carbon filter, for example through leaks, diffusion or permeation.

The invention is based on the problem of configuring a fuel tank of the type described in the introduction in such a way that fuel is particularly reliably prevented from escaping.

BRIEF DESCRIPTION OF THE INVENTION

According to the invention, this problem is solved through the fact that the activated carbon filter is arranged in the region of the chamber.

This configuration means that the fuel tank according to the invention does not require any connecting lines between the chamber and the activated carbon filter. Therefore, the connection between the activated carbon filter and the chamber of the fuel tank does not have any contact with the environment. Therefore, in the event of a leak or as a result of diffusion and permeation at the connection between the activated carbon filter and the chamber, it is impossible for any fuel vapors to pass into the environment. The fuel tank according to the invention particularly reliably prevents fuel from escaping into the environment. A further advantage of the fuel tank according to the invention consists in the fact that it is particularly compact and has a particularly small number of components which are to be fitted in the motor vehicle. Moreover, the invention makes it easy for the activated carbon filter to be integrated in the intended outer contour of the fuel tank according to the invention.

Over prolonged periods, the housing materials used in modern activated carbon filters are not able to withstand contact with liquid fuel. Therefore, consideration could be given to coating the housing of the activated carbon filter located inside the chamber or to making this housing from a fuel-resistant material. However, this makes the activated carbon filter expensive. However, according to an advantageous refinement of the invention, the activated carbon filter can be produced at particularly low cost if it is arranged inside a compensation tank arranged in the chamber. This configuration allows the compensation tank to protect the activated carbon filter from contact with liquid fuel.

The fuel tank according to the invention is of particularly simple design if a wall of the compensation tank has a molded formation for holding the activated carbon filter.

According to another advantageous refinement of the invention, it is possible to particularly reliably prevent the activated carbon filter from being wetted with fuel by securing the compensation tank and/or the activated carbon filter to the inner side of the upper wall of the fuel tank.

A configuration in which the compensation tank and/or the activated carbon filter forms a preassemblable structural unit with a shell part which forms an upper wall of the fuel tank makes the fuel tank according to the invention particularly simple to assemble.

Assembly of the fuel tank according to the invention is further simplified if housing parts of the activated carbon filter and/or of the compensation tank are joined by material-to-material bonding. This allows the components of the fuel tank to be, for example, welded without difficulty.

According to another advantageous refinement of the invention, the number of connection points between the activated carbon filter and the chamber can be kept particularly small if connections for vent lines which are guided into the region above the fuel in the chamber are arranged in housing parts of the activated carbon filter and/or of the compensation tank.

The chamber requires a line which leads via the activated carbon filter into the environment for the purpose of pressure equalization. According to another advantageous refinement of the invention, contact between liquid fuel and the connection of the line of the activated carbon filter which leads into the environment can be particularly reliably avoided if a vent line which is intended for pressure equalization with the environment is guided through a common region of the wall of the chamber and of the compensation tank or of the activated carbon filter.

According to another advantageous refinement of the invention, assembly of the activated carbon filter in the compensation tank is further simplified if a housing part of the activated carbon filter is formed integrally with the compensation tank. This allows the activated carbon filter to be filled with activated carbon, welded closed and connected to the ventilation system during assembly. Finally, the compensation tank is welded closed.

According to another advantageous refinement of the invention, protection against wetting of the activated carbon filter is further increased if a housing of the activated carbon filter is of double-walled design.

According to another advantageous refinement of the invention, assembly of the activated carbon filter is further simplified if the activated carbon filter has a cartridge comprising activated carbon which can be inserted into the compensation tank.

Connecting the activated carbon filter to the ventilation system of the fuel tank according to the invention requires particularly little assembly work if a line which is to be connected to the activated carbon filter has a plug connection part.

BRIEF DESCRIPTION OF THE DRAWINGS

The invention permits numerous embodiments. One of these is illustrated in the drawing and described below for the purpose of further explaining the basic principle of the invention. In the drawing.

DETAILED DESCRIPTION OF THE INVENTION

Figure 1:
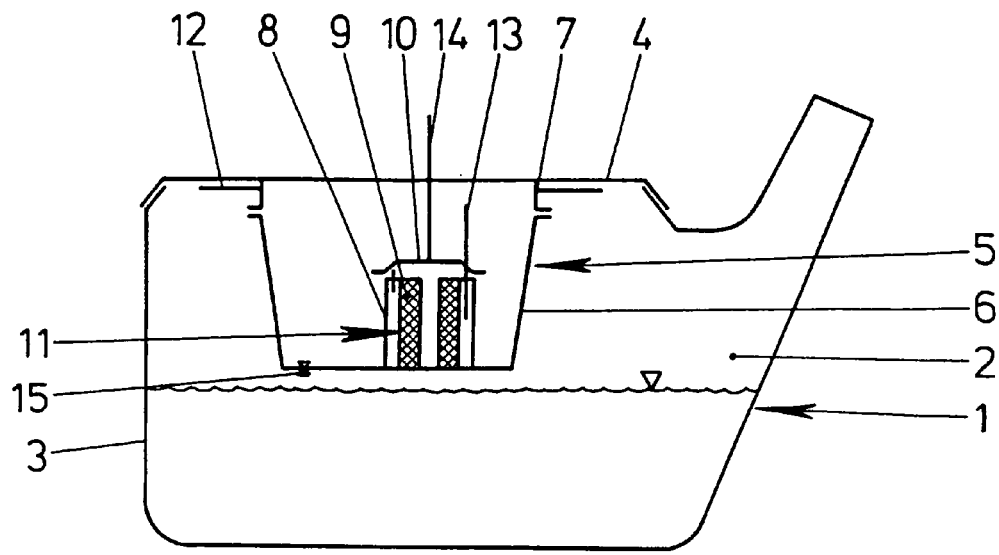
FIG. 1 diagrammatically depicts a fuel tank according to the invention having an activated carbon filter arranged in a compensation tank.

FIG. 1 diagrammatically depicts a fuel tank in longitudinal section, having a chamber 2 for holding fuel and having two shell parts 3, 4. A compensation tank 5 arranged in the fuel tank 1 has a housing part 6 of pot-shaped configuration and is secured to the upper of the shell parts 4 by material-to-material bonding. The upper shell part 4 has an edge 7 for this purpose. The base region of the pot-shaped housing part 6 of the compensation tank 5 is produced integrally with a housing part 8 of an activated carbon filter 9. The housing part 8 is joined to a cover 10 by material-to-material bonding. The activated carbon filter 9 has a cartridge 11 comprising activated carbon which has been inserted into the housing part 8. Of course, the activated carbon filter 9 can also be produced by activated carbon being introduced into the housing part 8. Vent lines 12 lead into the compensation tank 5 through the upper edge 7 of the shell part 4 of the fuel tank 1. The activated carbon filter 9 is likewise connected to the inner region of the compensation tank 5 via a vent line 13. A further vent line 14 leads through a common region of the wall of the fuel tank 1 with the compensation vessel 5 into the environment. As a result, for example in the event of thermal expansion of the fuel in the chamber 2, gases can flow through the vent lines 12 into the compensation tank 5 and, from there, through the activated carbon filter 9 into the environment. Furthermore, a base valve 15 which ensures that liquid fuel which has penetrated into the compensation tank 5 is returned to the chamber 2 is arranged in the base region of the compensation tank 5. On account of the position at which it is arranged, the activated carbon filter 9 in the compensation tank 5 is substantially protected from contact with liquid fuel.

Figure 2:
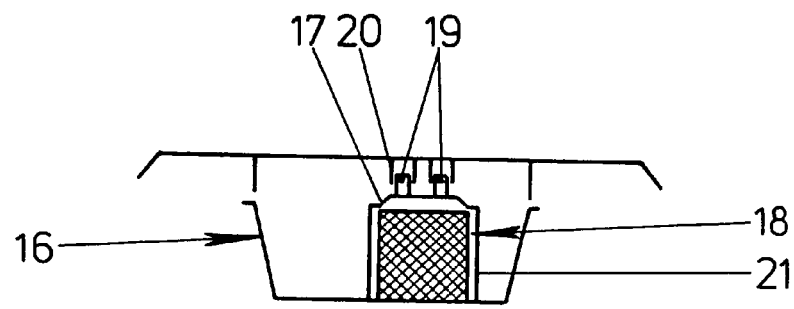
FIG. 2 shows an activated carbon filter which is secured to an upper shell part of a further embodiment of the fuel tank according to the invention.

FIG. 2 shows a compensation tank 16 for the fuel tank 1 from FIG. 1. This differs from that shown in FIG. 1 substantially through the fact that a cover 17 of an activated carbon filter 18 arranged inside the compensation tank 16 has connections 19 and is connected to plug connections 20 arranged in the upper region of the wall. Moreover the activated carbon filter 18 has a double-walled housing 21.

Figures 3, 4:
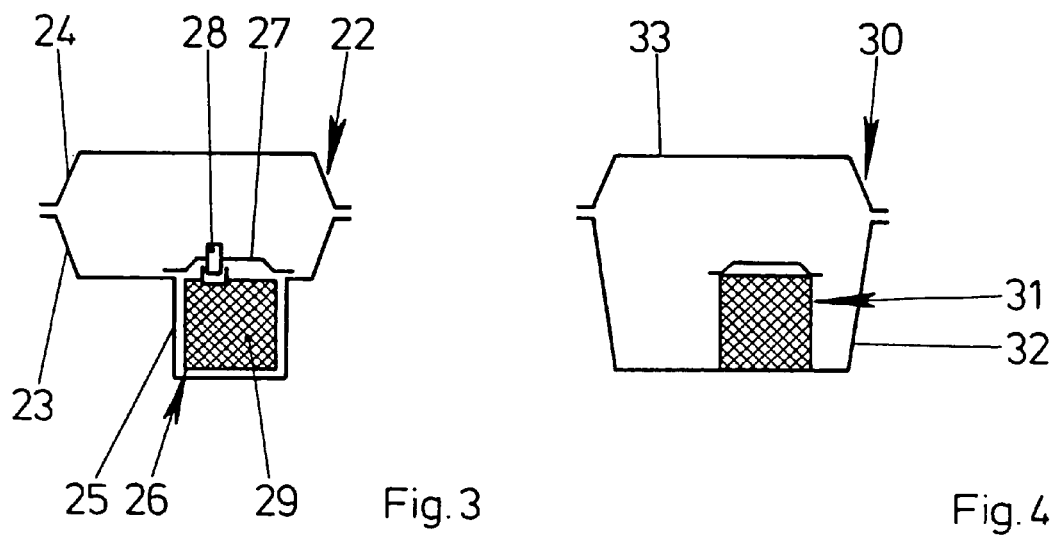
FIG. 3 shows an activated carbon filter arranged in a molded formation of a compensation tank.
FIG. 4 shows an activated carbon filter arranged in a base region of a compensation tank.

FIG. 3 shows a compensation tank 22 which is intended to be secured in a fuel tank (not shown). The compensation tank 22 has two housing parts 23, 24 which are welded to one another and, in the base region, a molded formation 25 for holding an activated carbon filter 26. A partition 27 for separating off the activated carbon filter 26 is welded to the base region of the compensation tank 22. A connection 28 for a vent line leads through the partition 27. This activated carbon filter 26 too has a cartridge 29 inserted into the molded formation 25 of the compensation tank 22. FIG. 4 shows a compensation tank 30 which is of particularly simple design and in which an activated carbon filter 31 is secured to the lower of two housing parts 32, 33 of the compensation tank 30. Vent lines (not shown) can be connected to the compensation tank 30 and the activated carbon filter 31.

The invention claimed is:

1. A fuel tank for a motor vehicle, comprising:
   (a) a wall delimiting a chamber for holding fuel;
   (b) a compensation tank located within the fuel holding chamber above the fuel level, the compensation tank having a molded formation in a wall thereof for holding an activated carbon filter; and
   (c) an activated carbon filter arranged in the molded formation.

2. The fuel tank as defined in claim 1, characterized in that a housing part of the activated carbon filter is produced integrally with the compensation tank.

3. The fuel tank as defined in claim 2, characterized in that a housing of the activated carbon filter is of double-walled design.

4. The fuel tank as defined in claim 1, characterized in that a line which is to be connected to the activated carbon filter has a plug connection part.

* * * * *